United States Patent

[11] 3,566,812

| [72] | Inventors | Edward Barnes<br>Speldhurst;<br>Kenneth Horace Nance, Bromley, Kent, England |
|---|---|---|
| [21] | Appl. No. | 735,664 |
| [22] | Filed | June 10, 1968 |
| [45] | Patented | Mar. 2, 1971 |
| [73] | Assignee | Direct Nitrogen Limited<br>London, England |
| [32] | Priority | June 28, 1967 |
| [33] | | Great Britain |
| [31] | | 29718/67 |

[54] DISPENSING APPARATUS
7 Claims, 1 Drawing Fig.

[52] U.S. Cl. ............................................ 111/7.3
[51] Int. Cl. ........................................ A01c 23/02

[50] Field of Search ........................................... 111/6—7, 7.1—7.4; 47/57.5

[56] References Cited
UNITED STATES PATENTS

| 2,808,786 | 10/1957 | Johnston | 111/7X |
| 2,821,944 | 2/1958 | Blake | 111/7.3 |
| 3,130,519 | 4/1964 | Mauget | 111/7.3X |

*Primary Examiner*—Robert E. Bagwill
*Attorney*—Wenderoth, Lind & Ponack

ABSTRACT: A pressure pack for dispensing anhydrous nitrogenous fertilizers containing anhydrous liquid ammonia and a normally solid compound soluble therein for example ammonium nitrate. The pack is safe to use and since the fertilizer is self dispensing no propellant is required. The pack is particularly useful for domestic garden use.

PATENTED MAR 2 1971
3,566,812
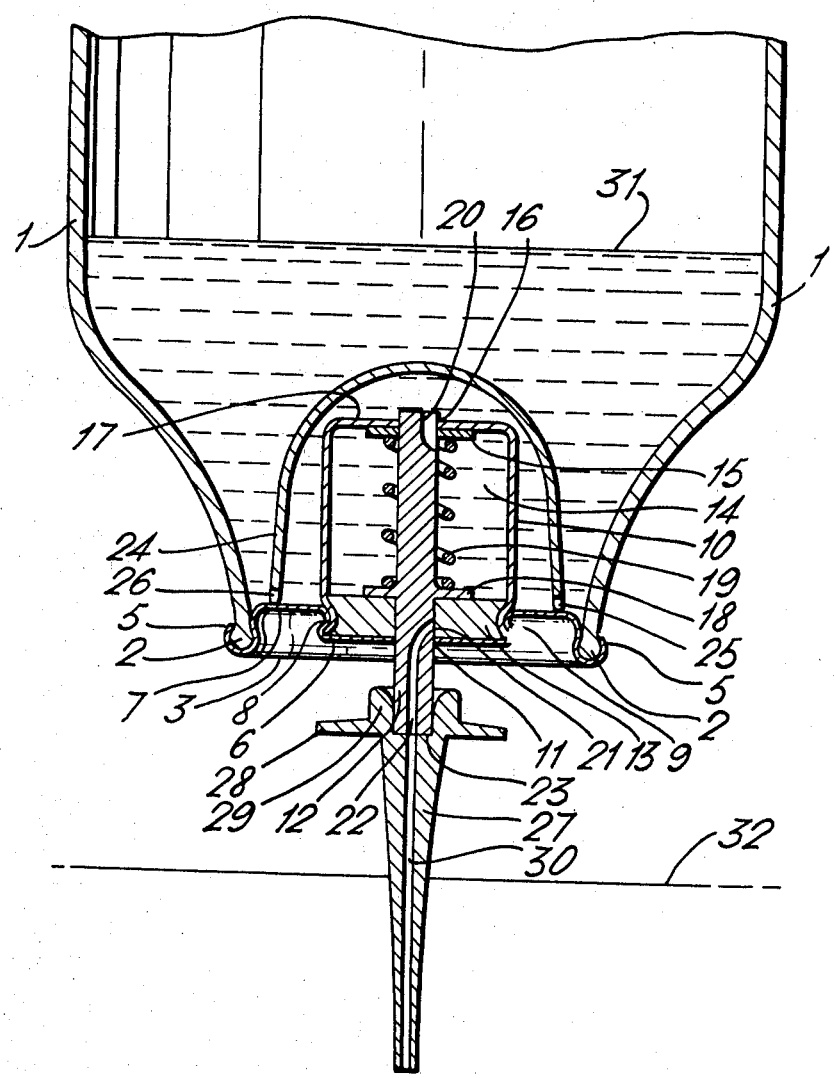
EDWARD BARNES AND KENNETH HORACE NANCE
INVENTORS
By Wenderoth, Lind & Ponack. Attorneys

DISPENSING APPARATUS

The present invention relates to dispensing apparatus and particularly to apparatus for dispensing anhydrous nitrogenous fertilizers.

It is known to inject anhydrous liquid ammonia into soil as a nitrogenous fertilizer on a large scale.

It is an object of the present invention to provide means whereby a nitrogenous fertilizer may be dispensed on a scale suitable for use, for example, in horticulture or domestic gardening.

According to the invention there is provided apparatus for dispensing an anhydrous nitrogenous fertilizer which comprises a pressure pack (herein defined as a pressuretight container adapted to be hand carried) provided with a valve and containing an anhydrous liquid fertilizer comprising anhydrous liquid ammonia in which is dissolved a normally solid compound soluble in liquid ammonia. The compound is preferably a salt and is preferably present in an amount in the range 25 to 150 parts by weight per 100 parts by weight of anhydrous liquid ammonia. The most useful concentrations lie in the range 50 to 100 parts by weight per 100 parts by weight of anhydrous liquid ammonia.

On releasing the valve of the pressure pack the anhydrous liquid fertilizer will dispense itself for as long as the valve is open, the vapor pressure of the liquid fertilizer in the pack being sufficient to expel from the pack substantially all the contents thereof. Thus a propellant which is a requirement for normal pressure packs is not required by the pack according to the present invention.

The presence of a dissolved compound in anhydrous liquid ammonia reduces the vapor pressure inside the pressure pack to a level considerably below that which would otherwise be required and renders the pack safe for general use. Any compound which is soluble in anhydrous ammonia may be used, but it is preferred to use a salt which acts as a fertilizer, for example ammonium nitrate.

The pressure pack may conveniently be a conventional aerosol canister. The aerosol canister used may be one of the type in which actuation of the valve, usually by depressing a button, releases the anhydrous liquid fertilizer for the duration of the period that the valve is actuated. Alternatively and preferably it may be one in which a predetermined quantity is released per actuation, such an arrangement being an economic and safe pack.

In one form of the pressure pack the nozzle of the valve via which fertilizer is released is in an elongated form for insertion into the soil. Suitably the elongated nozzle is detachable from the valve e.g. the nozzle may be capable of making "push-fit" engagement with the valve. The elongated nozzle may have a stop e.g. in the form of an annular disc situated at a suitable distance from the nozzle tip, so that when the nozzle is thrust into the ground it will penetrate until the stop meets the ground surface. Further pressure on the stop may then be arranged to actuate the valve and thereby release the liquid fertilizer. By this means, the correct quantity of fertilizer may be injected into the soil at depth which is fixed by the length of the nozzle. Thus by using a nozzle of the correct length it is possible to release the fertilizer into the soil at the correct depth for optimum utilization by the plant. The use of pressure packs for dispensing fertilizer in this manner also permits application with discrimination between plants it is desired to treat and weeds.

Ammonium nitrate/ammonia mixtures are particularly useful in the pressure packs of the present invention in that a combined slow-acting fertilizer and quick-acting fertilizer results. Moreover the reduction in vapor pressure is very marked so that pressure packs of the conventional domestic aerosol type may be used. An additional surprising advantage of this combination is a reduction in the handling hazard; liquid ammonia causes severe blistering of the skin and must be washed off instantly whereas it has been found that mixtures of ammonia and ammonium nitrate have no such effect and the need to wash the skin is not such a matter of urgency.

The pressure pack of the present invention in addition to containing liquid ammonia and an ammonia-soluble compound may also contain other plant nutrients e.g. sources of potassium, phosphorus and/or trace elements e.g. sulfur, copper, magnesium and zinc. These sources must be in such a form that they are soluble in liquid ammonia. Moreover pesticides, e.g. nematocides and herbicides, may also be added to the anhydrous liquid fertilizer provided they are compatible therewith.

A particular embodiment of the present invention will now be described with reference to the accompanying drawing in which is shown an aerosol canister suitable for dispensing an anhydrous nitrogenous fertilizer. The drawing is a sectional elevation showing the valve arrangement in the neck of the canister, the canister being inverted ready for injection of the fertilizer into soil.

The aerosol canister comprises a container having walls 1 and a neck 2 closed by a cap 3 which is bent over the neck 2 at 5 to form a fluidtight seal. The central portion 6 of the cap 3 is raised from the base 7 of the cap and is crimped at 8 and 9 onto an enclosure 10 which supports the valve arrangement. Through a port 11 in the raised portion 6 of the cap passes a moveable rod 12 which passes through a rubber gasket 13 crimped in position at 8 and 9 and making fluidtight contact with the moveable rod 12 and the sides of the enclosure 10. The rod 12 then passes into the chamber 14 formed by the enclosure 10, through a second rubber gasket 15 making fluidtight contact therewith and through a port 16 in the base 17 of the enclosure 10. The rod 12 has a fixed annular disc 18 and disposed around the rod is a spring 19 one end of which bears against the disc 18 and the other against the interior of the base 17 of the enclosure 10. The rod 12 is cut away at its end at 20 and is provided in its side with a port which communicates with a channel 22 extending through the rod to its top end 23. The valve arrangement is surrounded by a thimble 24 provided with ports 25 and 26, the thimble ensuring that liquid fertilizer will surround the valve when the canister is nearly empty. A nozzle extension 27, having an annular disc 28, an annular rim 29 upstanding therefrom, and a central passage 30 is in "push-fit" engagement with the end 23 of the rod 12, so that the passage 22 and the passage 30 are in intercommunication. The level of liquid fertilizer in the canister is shown by line 31. Ground level is shown by line 32.

In operation, the nozzle extension 27 may be thrust into the ground until the annular disc 28 meets the ground surface. Further thrust will exert sufficient pressure on the disc 28 and thence onto the movable rod 12 to cause it to close the port 16 against the action of the spring 19. The chamber 14 will then be cut off from the supply of liquid fertilizer in the canister and the port 21 will be in communication with the chamber 14, when the contents of the chamber will be expelled via channels 22 and 29 under the vapor pressure of the fertilizer. On removing the nozzle from the ground, the pressure on the spring 19 will be released, the movable rod 12 will resume the position shown in the diagram permitting liquid fertilizer to enter the chamber 14 via the gap left between the cutaway portion 20 of the rod and the port 16. The volume of liquid fertilizer dispensed will be the volume of the chamber 14 and this can be varied if desired.

A particular advantage of the pressure pack according to the present invention is that there is no need to include a propellant in the pack because the vapor pressure of the liquid ammonia mixture is sufficient to completely self-dispense the mixture.

The term "normally solid compound" used throughout this specification means a compound which is solid under conditions of normal temperature and pressure.

We claim:

1. Apparatus for dispensing an anhydrous nitrogenous fertilizer which comprises a pressuretight container adapted to be hand carried, having a valve mounted on said container and adapted to release the contents from said container when actuated and containing an anhydrous liquid fertilizer consisting of anhydrous liquid ammonia, in which is dissolved 25 to 150 parts by weight of a normally solid salt per 100 parts by weight of anhydrous liquid ammonia.

2. Apparatus according to claim 1 wherein the salt is present in an amount in the range 50 to 100 parts by weight per 100 parts by weight of any anhydrous liquid ammonia.

3. Apparatus according to claim 1 wherein the salt acts as a fertilizer.

4. Apparatus according to claim 1 wherein the salt is ammonium nitrate.

5. Apparatus according to claim 1 wherein the valve is arranged to release a predetermined quantity of anhydrous nitrogenous fertilizer for each actuation of the valve.

6. Apparatus for dispensing into the soil anhydrous nitrogenous fertilizer which comprises a pressuretight container adapted to be hand carried containing an anhydrous liquid fertilizer consisting of anhydrous liquid ammonia in which is dissolved 25—150 parts by weight of a normally solid salt per 100 parts by weight of anhydrous liquid ammonia, a valve being mounted on the pressuretight container which, when actuated, releases the fertilizer from the container, said valve being provided with an elongated nozzle for insertion into the soil.

7. Apparatus according to claim 6 wherein the elongated nozzle is provided with a stop situated at a distance from the tip of the nozzle to prevent the nozzle being inserted into the soil beyond the stop.